(12) United States Patent
Han (10) Patent No.: US 11,841,555 B2
(45) Date of Patent: Dec. 12, 2023

(54) METHOD FOR MEASURING THE FRAME WEARING PARAMETER AND MEASURING DEVICE THEREOF

(71) Applicant: ASUSTeK COMPUTER INC., Taipei (TW)

(72) Inventor: Chia-Hui Han, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 443 days.

(21) Appl. No.: 17/105,738

(22) Filed: Nov. 27, 2020

(65) Prior Publication Data

US 2021/0181538 A1    Jun. 17, 2021

(30) Foreign Application Priority Data

Dec. 12, 2019    (TW) ................................ 108145602

(51) Int. Cl.
  *G02C 13/00*    (2006.01)
  *G06T 17/00*    (2006.01)
  *G06V 40/19*    (2022.01)
  *G06V 40/16*    (2022.01)

(52) U.S. Cl.
  CPC ............ *G02C 13/005* (2013.01); *G06T 17/00* (2013.01); *G06V 40/166* (2022.01); *G06V 40/171* (2022.01); *G06V 40/19* (2022.01)

(58) Field of Classification Search
  CPC .... G02C 13/005; G06T 17/00; G06V 40/166; G06V 40/171; G06V 40/19
  USPC ........................................................ 351/204
  See application file for complete search history.

(56) References Cited

U.S. PATENT DOCUMENTS

| | | | |
|---|---|---|---|
| 2010/0157243 A1* | 6/2010 | Boutinon | G02C 13/005 |
| | | | 351/159.75 |
| 2016/0299360 A1* | 10/2016 | Fonte | G06T 19/20 |
| 2017/0269384 A1* | 9/2017 | Tiemann | G02C 13/005 |
| 2019/0033624 A1 | 1/2019 | Breuninger et al. | |

FOREIGN PATENT DOCUMENTS

| | | |
|---|---|---|
| CN | 101398534 A | 4/2009 |
| CN | 104574504 A | 4/2015 |
| CN | 105866950 A | 8/2016 |
| CN | 107924073 B | 4/2018 |
| CN | 108885359 A | 11/2018 |
| EP | 3304183 A1 | 4/2018 |
| EP | 3339943 A1 * | 6/2018 |

* cited by examiner

*Primary Examiner* — Mohammed A Hasan
*Assistant Examiner* — Rahman Abdur
(74) *Attorney, Agent, or Firm* — McClure, Qualey & Rodack, LLP (57) ABSTRACT

A measure method and a measure device are provided. The measure method includes: scanning a face of a testee wearing a positioning frame to obtain pupil positions, visual directions, and a 3D face model, the 3D face model wears a positioning frame model corresponding to the positioning frame; superposing a 3D glasses reference model on the positioning frame model of the 3D face model; calculating an inner intersection point of the visual directions and the 3D glasses reference model; and calculating out a back vertex distance according to the pupil positions and the inner intersection point and calculate an angle between a lens plane line of the 3D glasses reference model and a space vertical line to regard as a pantoscopic tilt.

15 Claims, 7 Drawing Sheets

METHOD FOR MEASURING THE FRAME WEARING PARAMETER AND MEASURING DEVICE THEREOF

CROSS-REFERENCE TO RELATED APPLICATION

This application claims the priority benefit of Taiwan application serial No. 108145602, filed on Dec. 12, 2019. The entirety of the above-mentioned patent application is hereby incorporated by reference herein and made a part of specification.

BACKGROUND OF THE INVENTION

Field of the Invention

The invention relates to a method and a device for measuring a frame wearing parameter.

Description of the Related Art

A frame of sports glasses features with high-curvature wraparound frame. The angles between lens of sports glasses and visual directions are about 15 to 30 degrees. However, astigmatism occurs. Thus, the original prescription is no longer precise. As a result, the parameters of sports glasses need to be calculated via Digital Ray Path (DRP) technology. Then, the correction effect is more precise than the effect only according to prescription.

All personal frame wearing parameters can be taken into consideration via the DRP technology to simulate the condition that lens are in front of a user. The more data (such as a back vertex distance (BVD) and pantoscopic tilts) are provided, the better simulation effect can be obtained and gets a better visual effect. However, the frame wearing parameters (such as the back vertex distance and the pantoscopic tilts) usually need a special tool (such as a personization key) for measurement, which is time-consuming and not precise. Moreover, users always feels uncomfortable during the measure process.

BRIEF SUMMARY OF THE INVENTION

According to the first aspect of the disclosure, a method for measuring a frame wearing parameter is provided. The method includes: scanning a face of a testee wearing a positioning frame to obtain a pupil position, a visual direction, and a 3D face model, the 3D face model wears a positioning frame model corresponding to the positioning frame; superposing a 3D glasses reference model on the positioning frame model of the 3D face model; calculating an inner intersection point between the visual direction and the 3D glasses reference model; and calculating out a back vertex distance according to the pupil position and the inner intersection point and calculate an angle between a lens plane line of the 3D glasses reference model and a space vertical line to regard as a pantoscopic tilt.

According to the second aspect of the disclosure, a device for measuring a frame wearing parameter is provided. The device includes: a 3D image capture device configured to scan a face of a testee wearing the positioning frame from different angles to obtain a plurality of face images; and a computing device electrically connected to the 3D image capture device, the computing device obtains a pupil position, a visual direction, and a 3D face model according to the face images, the 3D face model wears a positioning frame model corresponding to the positioning frame, a 3D glasses reference model is superposed on the positioning frame model of the 3D face model via the computing device, an inner intersection point between the visual direction and the 3D glasses reference model is calculated via the computing device, a back vertex distance is calculated out according to the pupil position and the inner intersection point, and an angle between a lens plane line of the 3D glasses reference model and a space vertical line is calculated to regard as a pantoscopic tilt via the computing device.

In sum, the frame wearing parameters, such as a back vertex distance and pantoscopic tilts, are measured automatically in this disclosure, therefore, the measure method and the measure device provided in this disclosure are more efficient than the manual measure way. In addition, when the measure method and the measure device in this disclosure are applied, the testee would not feel uncomfortable in the measure process.

DETAILED DESCRIPTION OF THE EMBODIMENTS

A back vertex distance is the distance between a cornea and a lens. The angle between a lens surface and a space vertical line is a pantoscopic tilt. The frame wearing parameters, such as the back vertex distance and the pantoscopic tilts, are obtained via a superposing calculation of the 3D face model on the 3D glasses reference model.

Figure 1:
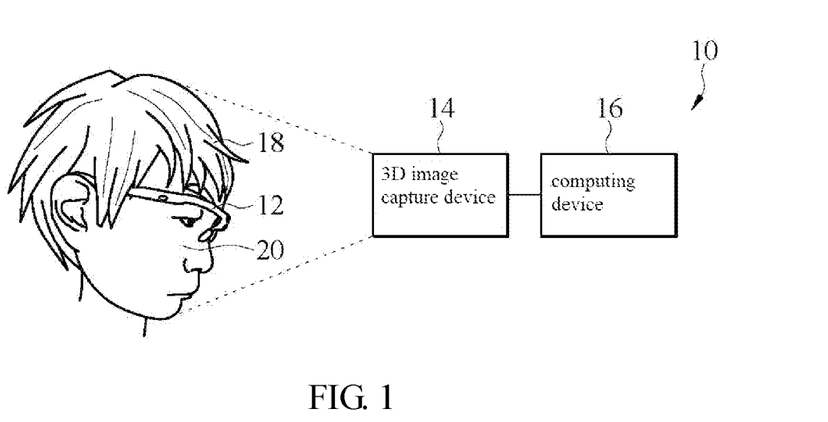
FIG. 1 is a block diagram showing a measure device according to an embodiment.

FIG. 1 is a block diagram showing a measure device according to an embodiment. The device 10 for measuring a frame wearing parameter includes a positioning frame 12, a 3D image capture device 14, and a computing device 16. The positioning frame 12 is worn on a face 20 of a testee 18. The 3D image capture device 14 is facing to the face 20 of the testee 18. The 3D image capture device 14 scans the face 20 of the testee 18 wearing the positioning frame 12 from different angles to obtain corresponding face images. The computing device 16 is electrically connected to the 3D image capture device 14 to receive the face images. Then, the computing device 16 performs calculation according to the face images to obtain the frame wearing parameters, such as the back vertex distance or the pantoscopic tilts. In an embodiment, the 3D image capture device 14 and the computing device 16 are independent devices. In an embodiment, the 3D image capture device 14 is a 3D infrared camera, and the computing device 16 is a mobile phone, a notebook, a tablet computer, or a desktop computer, which is not limited herein. In an embodiment, the 3D image capture device 14 and the computing device 16 are integrated in an electronic device. In an embodiment, the 3D image capture device 14 is a 3D infrared camera disposed in the electronic device. In an embodiment, the computing device 16 is a center processing unit (CPU) or a micro-processing device in the electronic device. In some embodiments, the electronic device is a mobile phone, a notebook, a tablet computer, or a desktop computer, which is not limited herein.

Figure 2:
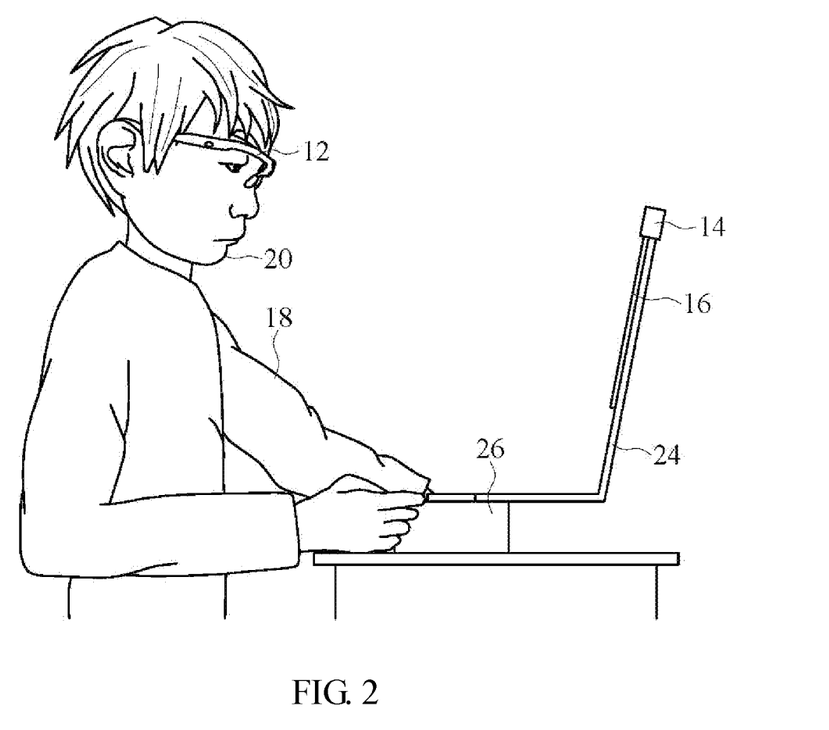
FIG. 2 is a schematic diagram showing positioning of a testee according to an embodiment.
Figure 3:
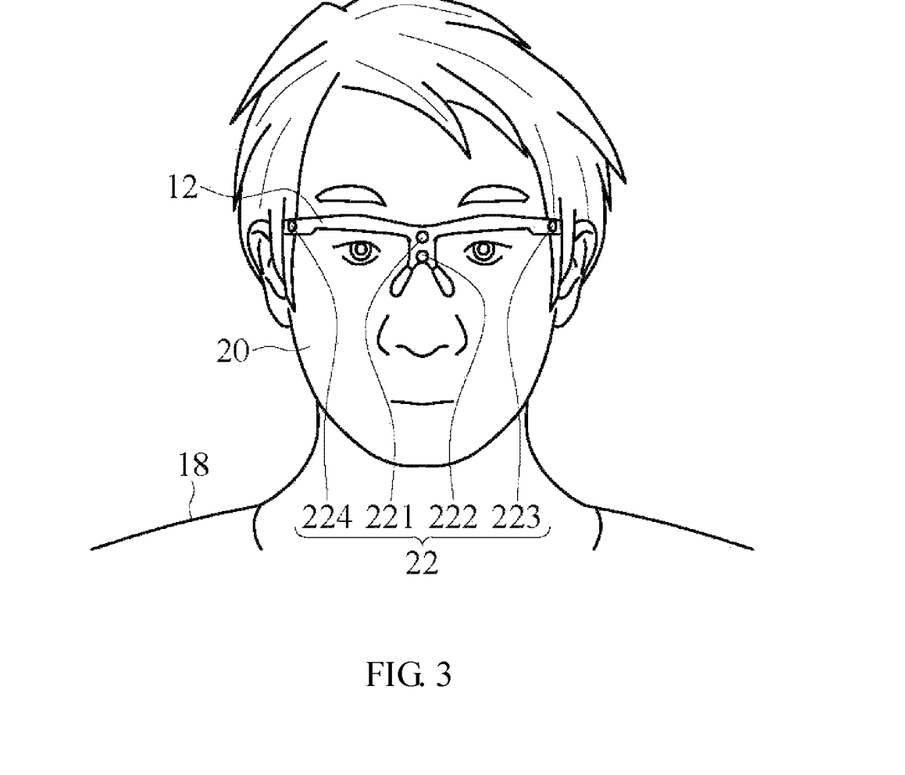
FIG. 3 is a schematic diagram showing a testee wearing a positioning frame according to an embodiment.

FIG. 2 is a schematic diagram showing positioning of a testee according to an embodiment. FIG. 3 is a schematic diagram showing a testee wearing a positioning frame according to an embodiment. Please refer to FIG. 1 and FIG. 3, before the frame wearing parameter is measured, the testee 18 wears the positioning frame 12 in front of the 3D image capture device 14. The positioning frame 12 includes four colored positioning marks 22—two center positioning marks 221, 222 located at the center of the nose pads of the positioning frame 12, respectively, one left positioning mark 223 and one right positioning mark 224 (the left side and the right side of the testee) located at two sides of the positioning frame 12. In an embodiment, the 3D image capture device 14 is disposed on a rotatable stand 24. A motor device 26 is connected to the rotatable stand 24 to drive the rotatable stand 24 to rotate the 3D image capture device 14 leftward or rightward by 207 degrees to capture face images from different angles.

Figure 4:
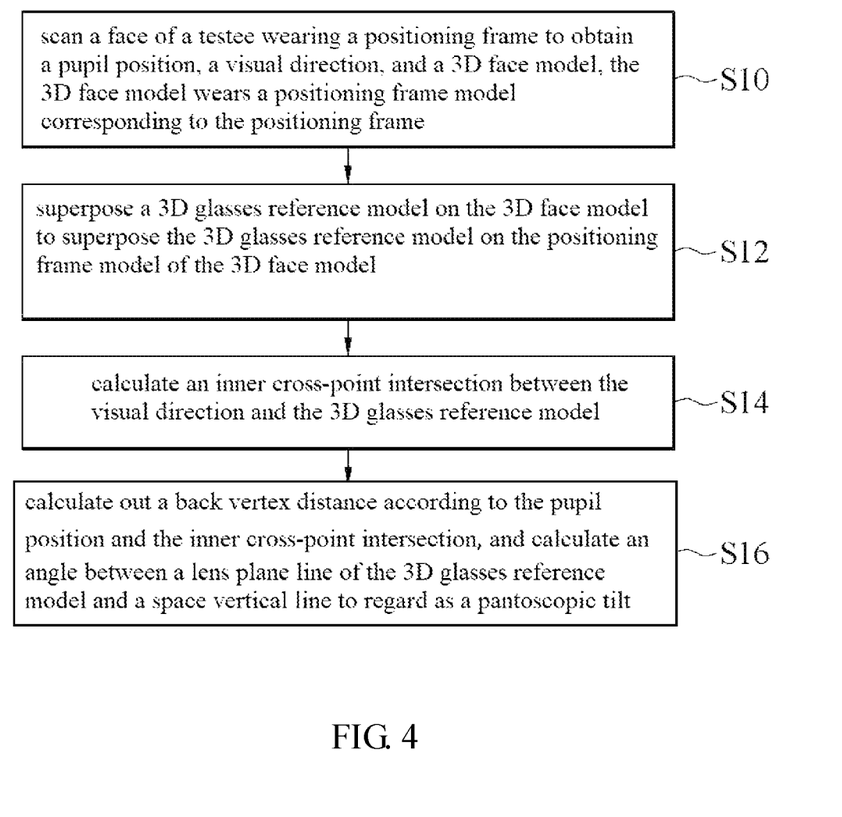
FIG. 4 is a flow chart showing a measure method according to an embodiment.
Figure 5:
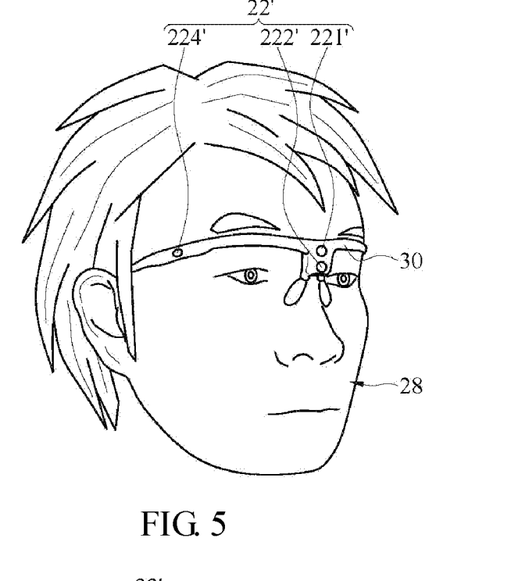
FIG. 5 is a schematic diagram showing a 3D face model according to an embodiment.

FIG. 4 is a flow chart showing a measure method according to an embodiment. Please refer to FIG. 1 to FIG. 4, when the testee 18 wearing the positioning frame 12 is in front of the 3D image capture device 14 and ready to be measured, the motor device 26 drives the rotatable stand 24 to rotate the 3D image capture device 14 disposed on the rotatable stand 24 leftward or rightward correspondingly. In step S10, the 3D image capture device 14 scans the face 20 of the testee 18 and the positioning frame 12 on the face 20 from different angles in sequence to obtain face images. The face images are transmitted to the computing device 16. The computing device 16 receives the face images and has a calculation to obtain two pupil positions, two visual directions, and a 3D face model 28. As shown in FIG. 5, the 3D face model 28 wears the positioning frame model 30 corresponding to the positioning frame 12.

Figure 6:
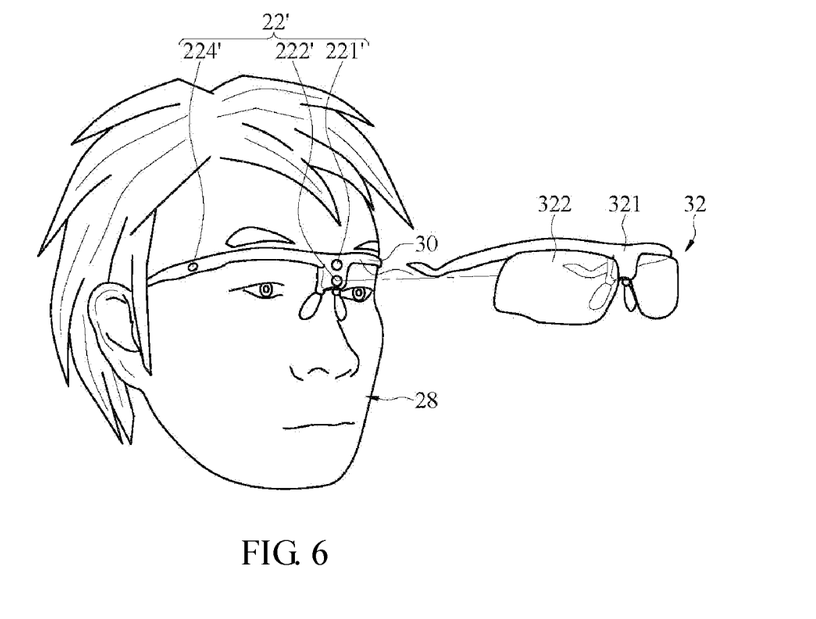
FIG. 6 is a schematic diagram showing a 3D face model is not superposed on a 3D glasses reference model yet according to an embodiment.
Figure 7:
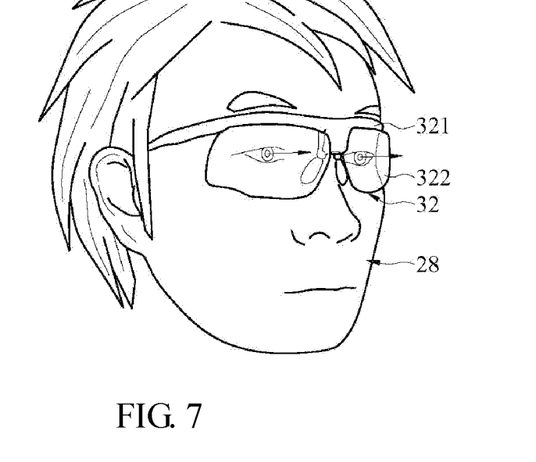
FIG. 7 is a schematic diagram showing a 3D face model is superposed on a 3D glasses reference model according to an embodiment.
Figure 8:
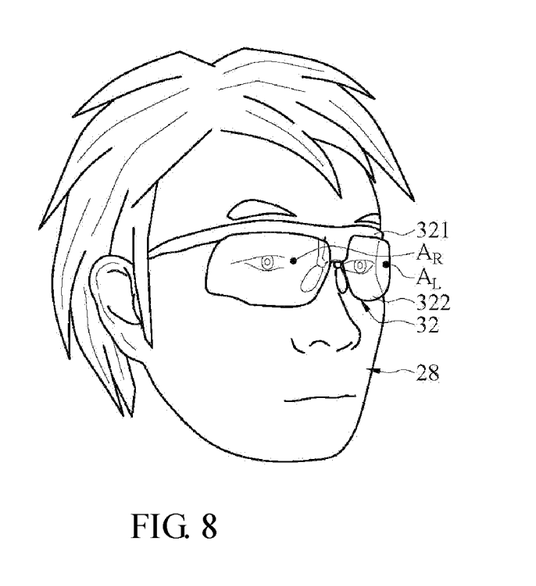
FIG. 8 is a schematic diagram showing a 3D face model with an inner intersection point according to an embodiment.

Then, the computing device 16 executes the superposing step. As shown in FIG. 6 and FIG. 7, a 3D glasses reference model 32 is superposed on the positioning frame model 30 of the 3D face model 28 (step S12). Since the positioning frame 12 includes the center positioning marks 221, 222, the left positioning mark 223, and the right positioning mark 224, the positioning frame model 30 on the 3D face model 28 also includes the center positioning marks 221',222', the left positioning mark (not shown), and the right positioning mark 224'. The 3D glasses reference model 32 is fully superposed on the positioning frame model 30 according to the center positioning marks 221', 222', the left positioning mark (not shown) and the right positioning mark 224' and a 4 points iterative closet point (ICP) algorithm. In an embodiment, the 3D glasses reference model 32 further includes a frame reference model 321 and a lens reference model 322. In an embodiment, in the superposing step, the whole 3D glasses reference model 32 (including the frame reference model 321 and the lens reference model 322) is directly superposed on the positioning frame model 30. In an embodiment, in the superposing step, the computing device 16 first superposes the frame reference model 321 on the positioning frame model 30 of the 3D face model 28 according to the positioning marks 22', and then superposes the lens reference model 322 on the frame reference model 321.

As shown in FIG. 1, FIG. 4, FIG. 7, and FIG. 8, the computing device 16 calculates two visual directions (the direction of the arrows from eyes shown in FIG. 7) of the 3D face model 28 and two inner intersection points $A_L$, $A_R$ (step 14) of the 3D glasses reference model 32. That is, two inner intersection points $A_L$, $A_R$ are cross points between the visual directions of the 3D face model 28 and inner sides of the lens of the lens reference model 322. Two inner intersection points $A_L$, $A_R$ include the left inner intersection point $A_L$ and the right inner intersection point $A_R$.

As shown in FIG. 1, FIG. 4, FIG. 8, FIG. 9a, and FIG. 9b, the computing device 16 calculates out back vertex distances $D_L$, $D_R$ according to the pupil positions and inner intersection points $A_L$, $A_R$, and then calculates the angle between the lens plane lines $L_L$, $L_R$ of the 3D glasses reference model 32 and a space vertical line $L_S$, respectively, to regard as pantoscopic tilts $\theta_L$, $\theta_R$ (step S16). The lens plane lines $L_L$, $L_R$ of the 3D glasses reference model 32 are pre-defined. The pupil positions include a left pupil position and a right pupil position, and thus the inner intersection points include the left inner intersection point $A_L$ and the right inner intersection point $A_R$. The left back vertex distance $D_L$ is calculated according to the distance between the left pupil position and the left inner intersection point $A_L$. The right back vertex distance $D_R$ is calculated out according to the distance between the right pupil position and the right inner intersection point $A_R$. The 3D glasses reference model 32 includes the left lens plane line $L_L$ and the right lens plane line $L_R$. A left pantoscopic tilt $\theta_L$ is obtained by calculating the angle between the left lens plane line $L_L$ and the space vertical line $L_S$. A right pantoscopic tilt $\theta_R$ is obtained by calculating the angle between the right lens plane line $L_R$ and the space vertical line $L_S$.

Figure 9A:
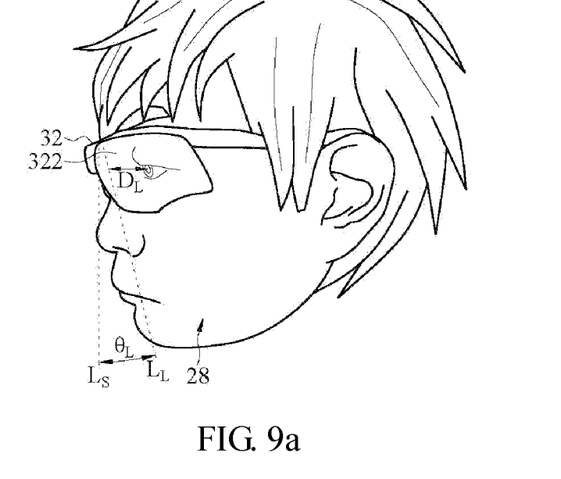
FIG. 9a is a schematic diagram showing a 3D face model with a back vertex distance and a pantoscopic tilt viewed from a left side according to an embodiment.
Figure 9B:
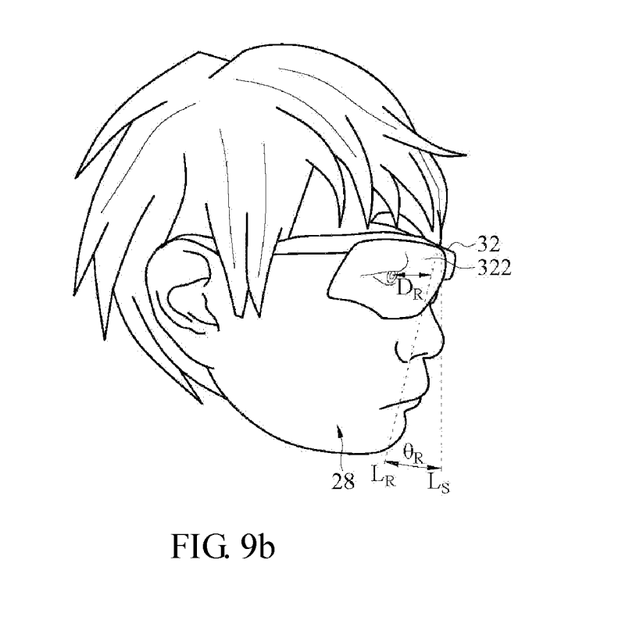
FIG. 9b is a schematic diagram showing a 3D face model with a back vertex distance and a pantoscopic tilt viewed from a right side according to an embodiment.

In an embodiment, the left lens plane line $L_L$ is a perpendicular line of the left inner intersection point $A_L$ on the lens reference model 322. The right lens plane line $L_R$ is a perpendicular line of the right inner intersection point $A_R$ on the lens reference model 322.

Figure 10:
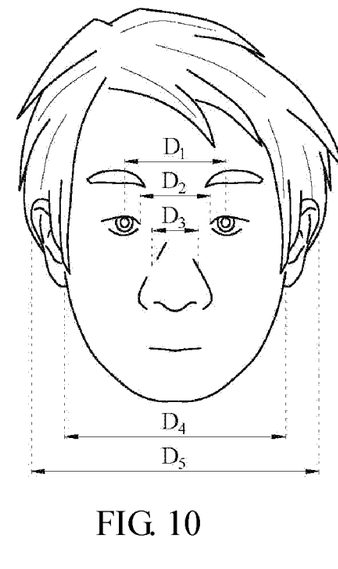
FIG. 10 is a schematic diagram showing a 3D face model with some frame wearing parameters according to an embodiment.

After the frame wearing parameters (the back vertex distances $D_L$, $D_R$ and the pantoscopic tilts $\theta_L$, $\theta_R$) are obtained, as shown in FIG. 10, the most proper glass for the testee is formed according to the frame wearing parameters, such as a pupil distance $D_1$, an eye distance $D_2$, a nose distance $D_3$, a face width $D_4$, and a head width $D_5$. Consequently, the vision correction effect is good.

In sum, the frame wearing parameters, such as a back vertex distance and pantoscopic tilts, are measured automatically in this disclosure, therefore, the measure method and the measure device provided in this disclosure are more efficient than the manual measure way. In addition, when the measure method and the measure device in this disclosure are applied, the testee would not feel uncomfortable in the measure process.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A method for measuring a frame wearing parameter, comprising:
   scanning a face of a testee wearing a positioning frame to obtain a pupil position, a visual direction, and a 3D face model, the 3D face model wears a positioning frame model corresponding to the positioning frame;
   superposing a 3D glasses reference model on the positioning frame model of the 3D face model;
   calculating an inner intersection point between the visual direction and the 3D glasses reference model; and
   calculating out a back vertex distance according to the pupil position and the inner intersection point and calculate an angle between a lens plane line of the 3D glasses reference model and a space vertical line to regard as a pantoscopic tilt.

2. The method for measuring the frame wearing parameter according to claim 1, wherein the 3D glasses reference model further includes a frame reference model and a lens reference model.

3. The method for measuring the frame wearing parameter according to claim 2, wherein the superposing step further includes a step of superposing the frame reference model on the positioning frame model of the 3D face model, and then superposing the lens reference model on the frame reference model.

4. The method for measuring the frame wearing parameter according to claim 2, wherein the positioning frame further includes a plurality of positioning marks, the frame reference model is superposed on the positioning frame model according to the positioning marks.

5. The method for measuring the frame wearing parameter according to claim 4, wherein the frame reference model is superposed on the positioning frame model according to the positioning marks and an iterative closest point (ICP) algorithm.

6. The method for measuring the frame wearing parameter according to claim 4, wherein the positioning marks includes two center positioning marks at a center of nose pads of the positioning frame, and a left positioning mark and a right positioning mark at two sides of the positioning frame.

7. The method for measuring the frame wearing parameter according to claim 2, wherein the lens plane line is a perpendicular line of the inner intersection point of the lens reference model.

8. The method for measuring the frame wearing parameter according to claim 1, wherein the pupil positions includes a left pupil position and a right pupil position, the inner intersection point includes a left inner intersection point and a right inner intersection point, the back vertex distance includes a left back vertex distance and a right back vertex distance, the left back vertex distance is calculated out according to the left pupil position and the left inner intersection point, and the right back vertex distance is calculated out according to the right pupil position and the right inner intersection point.

9. A device for measuring a frame wearing parameter, comprising:
   a 3D image capture device configured to scan a face of a testee wearing the positioning frame from different angles to obtain a plurality of face images; and
   a computing device electrically connected to the 3D image capture device, the computing device obtains a pupil position, a visual direction, and a 3D face model according to the face images, the 3D face model wears a positioning frame model corresponding to the positioning frame, a 3D glasses reference model is superposed on the positioning frame model of the 3D face model via the computing device, wherein the 3D glasses reference model further includes a frame reference model and a lens reference model, and an inner intersection point between the visual direction and the 3D glasses reference model is calculated via the computing device, a back vertex distance is calculated out according to the pupil position and the inner intersection point, and an angle between a lens plane line of the 3D glasses reference model and a space vertical line is calculated to regard as a pantoscopic tilt via the computing device, wherein the positioning frame further includes a plurality of positioning marks, the frame reference model is superposed on the positioning frame model according to the positioning marks, and the positioning marks includes two center positioning marks at a center of nose pads of the positioning frame, and a left positioning mark and a right positioning mark at two sides of the positioning frame.

10. The device according to claim 9, wherein the computing device superposes the frame reference model on the positioning frame model of the 3D face model, and then superposes the lens reference model on the frame reference model.

11. The device according to claim 10, wherein the computing device superposes the frame reference model on the positioning frame model according to the positioning marks and an iterative closest point (ICP) algorithm.

12. The device according to claim 9, wherein the pupil position includes a left pupil position and a right pupil position, the inner intersection point includes a left inner intersection point and a right inner intersection point, the back vertex distance includes a left back vertex distance and a right back vertex distance, the left back vertex distance is calculated out according to the left pupil position and the left inner intersection point, and the right back vertex distance is calculated out according to the right pupil position and the right inner intersection point.

13. The device according to claim 9, wherein the lens plane line is a perpendicular line of the inner intersection point of the lens reference model.

14. The device according to claim 9, wherein the 3D image capture device is a 3D infrared camera.

15. A method for measuring a frame wearing parameter, comprising:
   scanning a face of a testee wearing a positioning frame to obtain a pupil position, a visual direction, and a 3D face model, the 3D face model wears a positioning frame model corresponding to the positioning frame;
   superposing a 3D glasses reference model on the positioning frame model of the 3D face model, and the 3D glasses reference model further includes a frame reference model and a lens reference model;
   calculating an inner intersection point between the visual direction and the 3D glasses reference model; and
   calculating out a back vertex distance according to the pupil position and the inner intersection point and calculate an angle between a lens plane line of the 3D glasses reference model and a space vertical line to regard as a pantoscopic tilt;

wherein the positioning frame further includes a plurality of positioning marks, the frame reference model is superposed on the positioning frame model according to the positioning marks and an iterative closest point (ICP) algorithm.

\* \* \* \* \*